Figure 1:
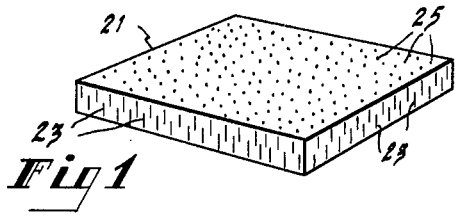

Oct. 19, 1965    E. FATUZZO ETAL    3,213,027
FERROELECTRIC DEVICE, FERROELECTRIC BODY
AND METHOD OF FABRICATION THEREOF
Filed March 30, 1962    2 Sheets-Sheet 1

INVENTORS
ENNIO FATUZZO
GUNTER HARBEKE &
WOLFGANG RUPPEL

W.S. Hill
AGENT

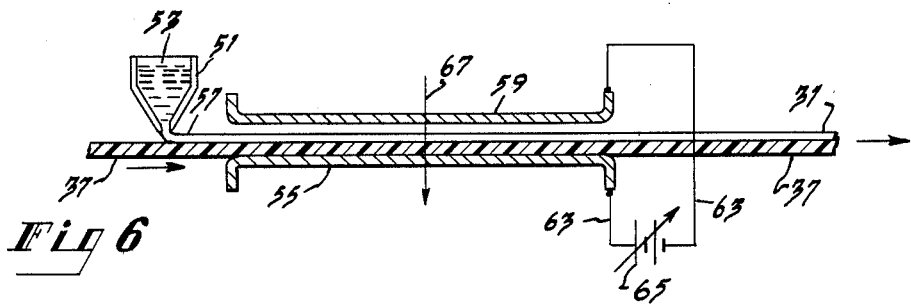
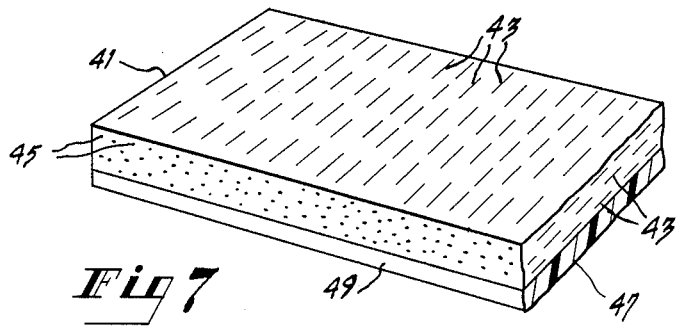
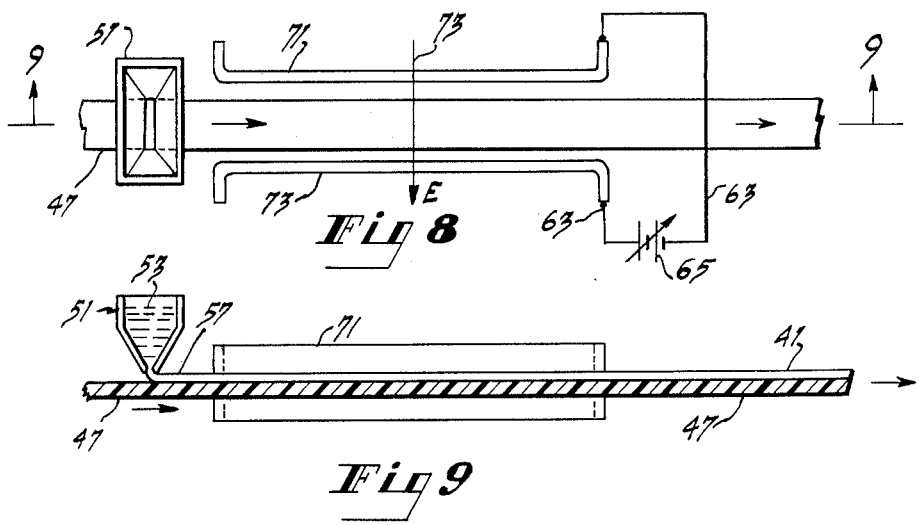

United States Patent Office 3,213,027
Patented Oct. 19, 1965

3,213,027
FERROELECTRIC DEVICE, FERROELECTRIC BODY AND METHOD OF FABRICATION THEREOF
Ennio Fatuzzo, Zurich, Gunter Harbeke, Affoltern, Albis, and Wolfgang Ruppel, Hedingen, Switzerland, assignors to Radio Corporation of America, a corporation of Delaware
Filed Mar. 30, 1962, Ser. No. 183,942
16 Claims. (Cl. 252—63.2)

This invention relates to a novel ferroelectric body and to a method of fabrication thereof. The invention includes also a novel ferroelectric device including the novel ferroelectric body of the invention.

A ferroelectric body displays a spontaneous polarization of electric dipoles that can be reversed by the application of an attainable electric field. This characteristic is described by a ferroelectric hysteresis loop which is produced by plotting the polarization of the body against the applied electric field. The remnant polarization is that polarization remaining after the polarizing field is removed. The polarization may be sensed by means of either a static or a dynamic probe positioned adjacent the body. The probe senses that portion of the polarization which results in an electric field external to the body. Some typical ferroelectric devices and their uses are described in: U.S. Patent 2,698,928 (ferroelectric recording tape), U.S. Patent 2,775,650 (ferroelectric recording drum), U.S. Patents 2,839,738 and 2,839,739, (ferroelectric switches), and U.S. Patents 2,793,288, 2,884,617, 2,918,655 (ferroelectric memories).

Previous ferroelectric bodies have been in the form of single crystals, sintered masses of ferroelectric particles, and resin-bound masses of ferroelectric particles. For a particular material, the remnant polarization is largest for a single crystal body of that material. In many applications, it is required to have a ferroelectric body which is larger than that which is economical or possible to grow as a single crystal. In such circumstances, the designer resorts to either a body of sintered ferroelectric particles or a body of resin-bound particles. Both of these bodies are polycrystalline and have the serious disadvantage that, for the same material, the remnant polorization is substantially smaller than for a single crystal of the same material. This is because the ferroelectric particles which compose the polycrystalline body have a random orientation and only a component of the total polarization of the particles is in the desired direction.

It is an object of this invention to provide an improved polycrystalline ferroelectric body.

Another object is to provide a method for preparing the improved ferroelectric body of the invention.

A further object is to provide an improved ferroelectric device.

In general, the ferroelectric body of the invention comprises acicular ferroelectric particles in an electrically-insulating binder therefor. The particles preferably have a length-to-width ratio of at least two-to-one, and exhibit a direction of strongest polarization, called the ferroelectric axis, substantially parallel to the long geometric axis of the particles. The particles are aligned in the body with their long geometric axes predominantly in a common direction and parallel to one another. By virtue of the acicularity, and under the proper conditions, the particles tend to align themselves parallel to each other and almost the entire polarization of the particles is in the desired direction. This alignment of particles may be optimized by the method of the invention. According to the method, a unidirectional electric field is applied to a quantity of ferroelectric particles in a liquid vehicle, whereby the particles become predominantly aligned in the desired direction. Subsequently, the vehicle may be solidified.

The ferroelectric devices of the invention may have one of several forms. In one embodiment, the device may comprise a ferroelectric body as described above and means, such as a pair of electrodes, for applying a unidirectional electric field substantially parallel to the long geometric axis of the particles. In another embodiment, the device comprises a support having a coating thereon comprising acicular ferroelectric particles in a binder. The particles in the binder may be aligned with their long geometric axes predominantly in a direction perpendicular to, parallel to or at an angle to the surface of the coating according to the desired application of the device.

Figure 3:
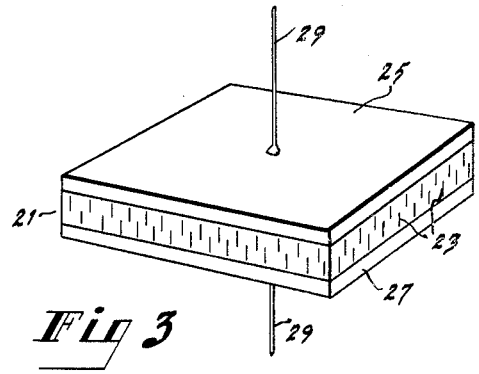
Figure 2:
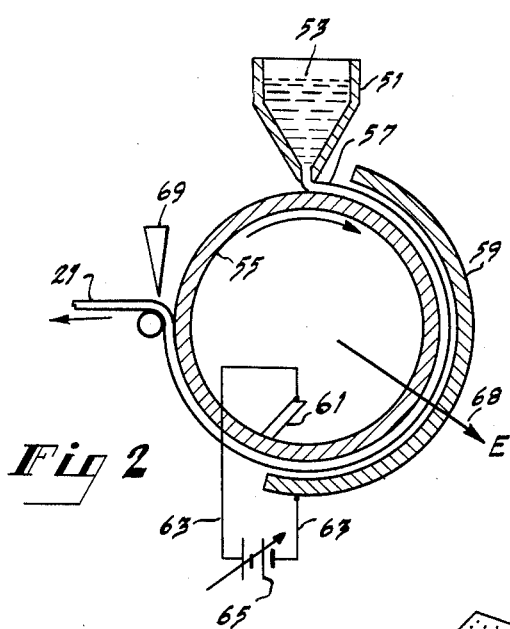
Figure 4:
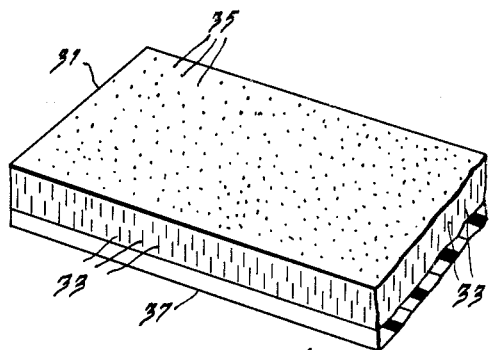
Figure 5:
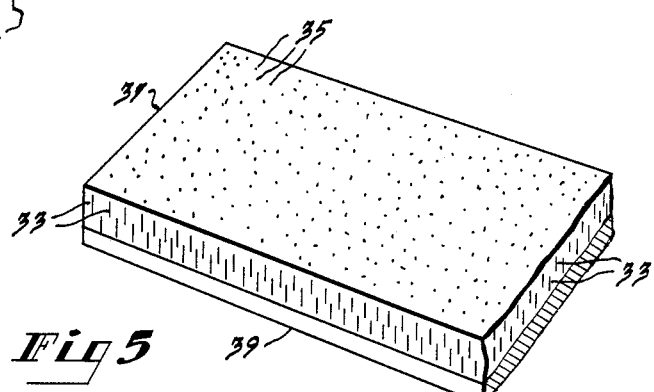

The novel features of the invention are set forth in greater detail in the following description which refers to the accompanying drawings in which:

FIGURE 1 is a perspective view of a typical ferroelectric body of the invention, FIGURE 2 is a sectional elevational view of an apparatus for fabricating the ferroelectric body of FIGURE 1, FIGURE 3 is a perspective view of a ferroelectric capacitor of the invention, FIGURE 4 is a first ferroelectric recording element of the invention, FIGURE 5 is a perspective view of a second ferroelectric recording element of the invention, FIGURE 6 is a sectional elevational view of an apparatus for preparing the recording element of FIGURE 4, FIGURE 7 is a perspective view of a third ferroelectric recording element of the invention, FIGURE 8 is a top view of an apparatus for fabricating the recording element of FIGURE 7 and, FIGURE 9 is a sectional elevational view of the apparatus of FIGURE 8 viewed along section lines 9—9.

Similar reference characters are used for similar structural elements tthroughout the drawings.

FIGURE 1 illustrates a typical ferroelectric body according to the invention. The body 21 comprises acicular ferroelectric particles 23 and 25 in a solid electrically-insulating binder. The particles have a length-to-width ratio of at least two-to-one. The ferroelectric axis, that is, the direction of strongest ferroelectric polarization, of each particle is substantially parallel to the long geometric axis of the particle. The particles are aligned with their long geometric axes predominantly parallel to each other, perpendicular to the two major surfaces of the body 21 as indicated by the dots 25, and parallel to the minor surfaces of the body 21 as indicated by the dashes 23. By virtue of the acicularity of the particles and of their alignment with their long geometric axes parallel to each other, almost the total polarization of the particles is in the desired direction, and the polarization of the body closely approaches that of a single crystal with the same density of ferroelectric material.

Ferroelectric particles were not previously known in the form of acicular particles. It has now been found that certain previously known V–VI–VII compounds are both ferroelectric and acicular. Further, the ferroelectric axis is parallel to the long geometric axis of the acicular particle. These compounds per se, but not their ferroelectric properties, are described by R. Nitsche and W. J. Merz in the Journal Phys., Chem. Solids, 13, 154–155 (1960), and may be described by the molar compositions V–VI–VII; wherein: V is at least one of Sb and Bi; VI is at least one of S, Se, and Te; and VII is at least one of Cl, Br, and I. These compounds are also photoconductive. Some typical examples of these compounds are: SbSBr, SbSeBr, SbTeI, BiSCl, BiSI, BiSeBr, and BiSeI.

The presently preferred ferroelectric compound is SbSI. Measurements were made on single crystal needles of SbSI about two millimeters long and about 0.2 millimeter wide. The measurements showed SbSI to be a relatively strong ferroelectric with values of polarization of about 25 microcoulombs/centimeter at 0° C. They were also found to require a relatively low coercive field for switching with values of about 100 volts/centimeter at 0° C., and to have a curie temperature of about 22° C. SbSI crystals can be switched between states of remanent polarization relatively fast, that is, at speeds of the order of three microseconds at about 1400 volts/centimeter with an exponential dependence down to about 70 volts/centimeter. When acicular SbSI particles are combined with an electrically-insulating binder to form a ferroelectric body of the invention, such as the body 21 of FIGURE 1, the body 21 exhibits ferroelectric properties closely approaching those of the single crystal.

The binder for the acicular ferroelectric particles should be electrically-insulating and, preferably, should be a low loss dielectric. Some suitable binders are vinyl chloride-acetate copolymers, methacrylate copolymers, cellulose acetate, cellulose nitrate, ethyl cellulose, polystyrene and polystyrene-butadiene copolymers.

The particles may be combined with the binder in any desired ratio. However, it is preferred that the body contain the highest loading; that is, the highest proportion of ferroelectric material to binder, so that the greatest volume proportion of the body is occupied with ferroelectric materal. It is preferred that at least 50% by volume of the body should be constituted of the acicular ferroelectric particles. The weight ratios will of course vary according to the specific gravity of the ferroelectric particles and of the binder. Generally, the ferroelectric particles should be 50 to 95 weight percent of the body, and preferably 65 to 80 weight percent of the body.

The ferroelectric body of FIGURE 1 may be fabricated by any one of a number of different methods. If the binder has a fairly low melting point, the binder is first melted and the acicular ferroelectric powder is mixed in. This molten mixture is formed to a desired shape, and then subjected to a unidirectional electric field applied in the desired direction, as by applying a voltage between two electrodes positioned around the shape. The effect of the electric field is to align the ferroelectric particles with their long geometric axes in the direction of the electric field. Since the ferroelectric axis of the particle is substantially parallel to the long geometric axis of the particle, the particles are predominantly aligned in the direction of the electric filed. Any field strength can produce an improvement in the alignment of the acicular particles. It is preferred to use electric field strengths between 1000 and 50,000 volts per inch. The binder is then solidified by freezing the binder thereby fixing the particles in their aligned positions. If the binder is soluble in a solvent, the binder may be dissolved in the solvent and the particles dispersed in the mixture. Then, the mixture is formed to a desired shape, the ferroelectric particles aligned in an electric field as described above, and the binder solidified by removing the solvent as by evaporation, thereby fixing the particles in their aligned positions.

FIGURE 2 illustrates one apparatus for preparing the body of FIGURE 1. The apparatus comprises a hopper 51 for feeding a liquid coating mixture 53 by gravity upon the outer surface of a cylindrical metal drum 55 to form a coating 57. The drum 55 is made to rotate (clockwise as viewed in FIGURE 2) carrying the coating 57 on the drum 55 through about three-quarters of a rotation of the drum 55. A field electrode 59 is closely spaced from the coating 57 over a portion of the rotation. A D.C. voltage is applied between the drum 55 and the electrode 59 from a battery 65 or other voltage source through connections 63 and a drum contact 61. The voltage produces an electric field perpendicular to the surface of the drum 55 and the coating 57 as indicated by the arrow 68. Hence, the field is unidirectional with respect to the coating 57 through the rotation of the drum 55. The electric field aligns the acicular ferroelectric particles in the wet coating with their ferroelectric axes substantially parallel to each other. The wet coating 57 is then solidified as by evaporation of the solvent contained therein. Finally, the solidified or dry coating 21 is stripped from the drum 55 with the aid of a scraper 69. The dry coating 21 may then be cut, punched, or otherwise formed to the desired body shape.

As a specific example, the following procedure may be followed using the apparatus of FIGURE 2. A liquid coating mixture 53 is prepared by mixing the following ingredients: 120 grams of finely-divided acicular SbSI particles, 60 grams of an 80% solution of silicone resin in xylene (SR–82, marketed by the General Electric Company, Silicone Products Division, Waterford, New York) and 105 grams of toluene. The coating mixture 53 is placed in the hopper 51 and flowed on to the surface of the drum 55 as the drum rotates to form a wet coating 57 having a desired thickness. The drum is about 24 inches in diameter and rotates at about 1 r.p.m. The field electrode 59 is spaced about 0.1 inch from the surface of the drum 55. A D.C. voltage of about 1000 volts is applied between the drum 55 and the electrode 59 to yield a field of about 10,000 volts/inch for aligning the acicular SbSI particles. After alignment, the coating is solidified by evaporating the toluene and the xylene in the coating. Evaporation may be aided by circulating air over the coating and/or applying heat to the coating. The dry coating 21 is stripped from the drum 55 to produce a sheet about 0.005 inch thick.

FIGURE 3 illustrates a ferroelectric capacitor of the invention. The capacitor comprises a ferroelectric body 21 which may be the same as the body illustrated in FIGURE 1. A pair of electrodes 25 and 27 are applied to the major surfaces of the body 21, and a pair of leads 29 are connected to the electrodes. The capacitor may be prepared, for example, by metallizing the opposite major surfaces of the dry film produced in the apparatus of FIGURE 2. Metallizing may be achieved by metal evaporation or electroless deposition, for example. A capacitor may also be produced by applying metal foil to the opposite major surface of the sheet 21. By still another method, a capacitor may be produced by mixing acicular ferroelectric particles in a molten binder, spacing two electrodes with the molten mixture between, applying a voltage to the electrodes to align the particles and then freezing the mixture.

FIGURE 4 illustrates a ferroelectric recording element comprising an insulating base 37, such as cellulose acetate foil, having a coating 31 of acicular ferroelectric particles in an electrically-insulating binder. The acicular ferroelectric particles are aligned with their long geometric axes perpendicular to the major surface as indicated by the dots 35 and parallel to the edges of the foil 37 as indicated by the dash lines 33. FIGURE 5 illustrates a similar ferroelectric recording element, except that there is an electrically-conducting base 39, such as aluminum metal foil.

The recording element of FIGURE 4 may be prepared in the apparatus illustrated in FIGURE 6, which includes a hopper 51 for holding a quantity of a liquid coating mixture 53, means (not shown) for moving a foil 37 under the hopper and along a predetermined path, and means for applying a unidirectional electric field 67 perpendicular to the surface of the foil 37 along the predetermined path. The means for applying the electric field include a pair of closely spaced electrodes 55 and 59 and a voltage source 65 connected to the electrodes through leads 63. In operation, the foil 37 is moved under the hopper, where it is coated with the liquid mixture 53 to a desired thickness to form a wet coating 57. Then, the wet coating passes between the electrodes 55 and 59, where the acicular ferroelectric particles are aligned perpendicular to the surface of the wet coating 57. Finally, the wet coating 57 is solidified and the recording element is ready for use. The recording element of FIGURE 5 may be fabricated in the apparatus of FIGURE 6, or in a similar apparatus which uses the base 39 of the recording element to perform the function of the electrode 55 in the apparatus of FIGURE 6.

FIGURE 7 illustrates another recording element similar to the recording element of FIGURE 4 except that the acicular ferroelectric particles are aligned with their long geometric axis perpendicular to the edge 49 of the foil 47 as indicated by the dots 45, and parallel to the major surface of the coating 41 as indicated by the dash lines 43.

The recording element of FIGURE 7 may be prepared in the apparatus illustrated in FIGURES 8 and 9 which is similar to the apparatus of FIGURE 6 except that the electrodes 55 and 59 of FIGURE 6 are replaced with electrodes 71 and 73. The electrodes 71 and 73 are positioned on opposite sides of the foil 47 so as to produce a unidirectional field parallel to the major surface of the foil 47 and transverse to the direction of travel of the foil. The unidirectional electric field is indicated by the arrow 73 in FIGURE 8. In other respects, the apparatus is constructed and operated as described for the apparatus of FIGURE 6.

What is claimed is:

1. A ferroelectric composition consisting essentially of acicular particles of a ferroelectric material in a dielectric binder therefor, said particles having a length-to-width ratio greater than about 2 to 1, said particles constituting 50 to 95 weight percent of said body, said particles being aligned with their long geometric axes predominantly in a common direction.

2. A ferroelectric composition which exhibits a substantially stronger ferroelectric polarization in one direction than in other directions consisting essentially of acicular particles of a ferroelectric material having a length-to-width ratio of at least 2 to 1 in a solid dielectric binder therefor, said particles constituting 50 to 95 weight percent of said body, each of said particles exhibiting a direction of strongest polarization substantially parallel to the long geometric axis of said particle, said particles being aligned with said long geometric axes predominantly in a direction substantially parallel to said one direction of said body.

3. A ferroelectric composition consisting essentially of acicular particles of a ferroelectric material in a dielectric binder therefor, said particles having a length-to-width ratio greater than about 2 to 1, said particles constituting 50 to 95 weight percent of said body, said particles being aligned with their long geometric axes predominantly in a common direction, said ferroelectric material having the molar formula V–VI–VII wherein V is one member selected from the group consisting of Sb and Bi, VI is one member selected from the group consisting of S, Se and Te, and VII is one member selected from the group consisting of Cl, Br, and I.

4. A ferroelectric composition which exhibits a substantially stronger ferroelectric polarization in one direction than in other directions consisting essentially of acicular particles of a ferroelectric material having a length-to-width ratio of at least 2 to 1 in a solid dielectric binder therefor, said particles constituting 68 to 80 weight percent of said body, each of said particles exhibiting a direction of strongest polarization substantially parallel to the long geometric axes of said particles, said particles being aligned with said long geometric axes predominantly in a direction substantially parallel to said one direction of said body, said ferroelectric material having the molar formula SbSI.

5. A solid ferroelectric device comprising a ferroelectric body which exhibits a substantially stronger ferroelectric polarization in one direction than in other directions consisting essentially of acicular particles of a ferroelectric material having a length-to-width ratio of at least 2 to 1 in a solid dielectric binder therefor, said particles constituting 50 to 95 weight percent of said body, each of said particles exhibiting a direction of strongest polarization substantially parallel to the long geometric axis of said particles, said particles being aligned with said long geometric axes predominantly in a direction substantially parallel to said one direction of said body, and means for applying an electric field to said body in a direction substantially parallel to said one direction.

6. A solid ferroelectric device comprising a ferroelectric body which exhibits a substantially stronger ferroelectric polarization in one direction than in other directions consisting essentially of acicular particles of a ferroelectric material having a length-to-width ratio greater than 2 to 1 in a solid dielectric binder therefor, said particles constituting 68 to 80 weight percent of said body, each of said particles exhibiting a direction of strongest polarization substantially parallel to the long geometric axis of said particles, said particles being aligned with said long geometric axes predominantly in a direction substantially parallel to said one direction of said body, and a pair of electrodes attached to said body for applying an electric field to said body in a direction substantially parallel to said one direction.

7. A ferroelectric device comprising a solid ferroelectric body which exhibits a substantially stronger ferroelectric polarization in one direction than in other directions consisting essentially of acicular particles of a ferroelectric material having a length-to-width ratio greater than 2 to 1 in a solid dielectric binder therefor, said particles constituting 50 to 95 weight percent of said body, said ferroelectric material having the molar formula V–VI–VII wherein V is at least one member selected from the group consisting of Sb and Bi VI is at least one member selected from the group consisting of S, Se and Te, and VII is at least one member selected from the group consisting of Cl, Br, and I, each of said particles exhibiting a direction of strongest polarization substantially parallel to the long geometric axes of said particles, said particles being aligned with said long geometric axes predominantly in a direction substantially parallel to said one direction of said body, and means for applying an electric field to said body in a direction substantially parallel to said common direction.

8. A ferroelectric recording element comprising a support having a ferroelectric coating on a surface thereof, said coating consisting essentially of acicular particles of a ferroelectric material having a length-to-width ratio greater than 2 to 1 in a solid dielectric binder therefor, said particles constituting 50 to 95 weight percent of said coating, a substantial proportion of said particles being aligned with their long axes in a common direction.

9. A ferroelectric recording element comprising electrically-conducting support having a ferroelectric coating on a surface thereof, said coating consisting essentially of acicular particles of a ferroelectric material having a length-to-width ratio greater than 2 to 1 in a solid dielectric binder therefor, said particles constituting 50 to 95 weight percent of said coating a substantial proportion of said particles being aligned with their long axes perpendicular to the surface of said support.

10. A ferroelectric recording element comprising a support having a ferroelectric coating on a surface thereof, said coating consisting essentially of acicular particles of a ferroelectric material having a length-to-width ratio greater than 2 to 1 in a solid dielectric binder therefor, said particles constituting 50 to 95 weight percent of said coating, a substantial proportion of said particles being aligned with their long axes parallel to the surface of the support.

11. A ferroelectric recording element comprising a support having a ferroelectric coating on a surface thereof said coating consisting essentially of acicular particles of a ferroelectric material having a length-to-width ratio greater than 2 to 1 in a solid dielectric binder therefor, said particles constituting 50 to 95 weight percent of said coating, said ferroelectric material having the molar formula V–VI–VII wherein V is at least one member selected from the group consisting of Sb and Bi, VI is at least one member selected from the group consisting of S, Se and Te, and VII is at least one member selected from the group consisting of Cl, Br, and I, a substantial proportion of said particles being aligned with their long axes in a common direction.

12. A ferroelectric recording element comprising an electrically-conducting support having a ferroelectric coating on a surface thereof, said coating consisting essentially of acicular particles having a length-to-width ratio greater than 2 to 1 of ferroelectric SbSI in a solid dielectric binder therefor, said particles constituting 68 to 80 weight percent of said coating a substantial proportion of said particles being aligned with their long axes in a common direction.

13. A method for preparing a ferroelectric body comprising mixing acicular ferroelectric particles having a length-to-width ratio greater than 2 to 1 with a dielectric binder and a liquid vehicle, forming said mixture to a desired shape, and then applying a unidirectional electric field to said shape, whereby said particles are aligned with their long axes in a common direction in said electric field, said particles constituting 50 to 95 weight percent of said body.

14. A method for preparing a ferroelectric body comprising producing a liquid mixture including acicular ferroelectric particles having a length-to-width ratio greater than 2 to 1 and a dielectric binder therefor, solidifying said liquid mixture to a solid, and applying a unidirectional electric field to said liquid mixture as the liquid mixture is solidified to a solid, said particles constituting 68 to 80 weight percent of said body.

15. A method for preparing a ferroelectric body comprising mixing acicular ferroelectric particles with a dielectric binder and a liquid vehicle, said particles having a length-to-width ratio of at least 2 to 1, the ferroelectric axis of said particles being substantially parallel to the long geometric axis of said particles, shaping said mixture while still fluid, applying a unidirectional electric field to said shape in the desired ferroelectric direction for said body, until a predominant proportion of said particles are aligned with their long geometric axes parallel thereto, and then solidifying said shape, said particles constituting 50 to 95 weight percent of said body.

16. A method for preparing a ferroelectric body comprising mixing acicular ferroelectric particles with a dielectric binder and a liquid solvent for said binder, said ferroelectric material having the molar formula V–VI–VII wherein V is at least one member selected from the group consisting of Sb and Bi, VI is at least one member selected from the group consisting of S, Se and Te, and VII is at least one member selected from the group consisting of Cl, Br, and I, said particles having a length-to-width ratio of at least 2 to 1, the ferroelectric axis of said particles being substantially parallel to the long geometric axis of said particles, shaping said mixture while still fluid, applying a unidirectional electric field to said shape in the desired ferroelectric direction for said body, until a predominant proportion of said particles are aligned with their long geometric axes parallel thereto, and then removing said solvent, said particles constituting 50 to 95 weight percent of said body.

References Cited by the Examiner

UNITED STATES PATENTS

| 2,791,705 | 5/57 | Vieweg | 260—41 XR |
| 2,839,738 | 6/58 | Wolfe | 252—63.5 XR |
| 3,052,539 | 9/62 | Greig | 252—501 |
| 3,095,668 | 7/63 | Dorsett | 252—62.5 |

OTHER REFERENCES

Nitsche et al.: Photoconduction, etc., Phys. and Chem. of Solids, vol. 13–14, 1960 pp. 154 and 155.

JULIUS GREENWALD, *Primary Examiner.*

JOSEPH R. LIBERMAN, *Examiner.*